United States Patent [19]

Sato

[11] Patent Number: 4,563,700

[45] Date of Patent: Jan. 7, 1986

[54] PICTURE SIGNAL PROCESSING METHOD AND APPARATUS THEREFOR

[75] Inventor: Yuichi Sato, Kawasaki, Japan

[73] Assignee: Canon Kabushiki Kaisha, Tokyo, Japan

[21] Appl. No.: 490,415

[22] Filed: May 2, 1983

[30] Foreign Application Priority Data

May 8, 1982 [JP] Japan ................... 57-76918

[51] Int. Cl.4 .............................. H04N 1/46
[52] U.S. Cl. ...................... 358/75; 358/78; 358/79; 358/138; 358/140; 358/280
[58] Field of Search .............. 358/138, 140, 75, 78, 358/79, 280

[56] References Cited

U.S. PATENT DOCUMENTS

| 2,974,195 | 3/1961 | Julesz | 358/138 |
| 3,478,164 | 11/1969 | Southworth | 358/140 |
| 4,292,652 | 9/1981 | Yumde | 358/138 |
| 4,303,947 | 12/1981 | Stoffel | 358/138 |
| 4,393,371 | 7/1983 | Morgan-Smith | 358/138 |

Primary Examiner—Howard W. Britton
Attorney, Agent, or Firm—Fitzpatrick, Cella, Harper & Scinto

[57] ABSTRACT

A picture signal processing method and apparatus therefor, in which picture signals consisting of plural horizontal scanning lines are sampled with first sampling signals generated at an interval of the horizontal scanning period, and the sampled output signals obtained by that sampling are sampled with second sampling signals generated at an interval different from that of the first sampling signals, obtains picture signals of vertical scanning with an arbitrary number of picture elements.

23 Claims, 10 Drawing Figures

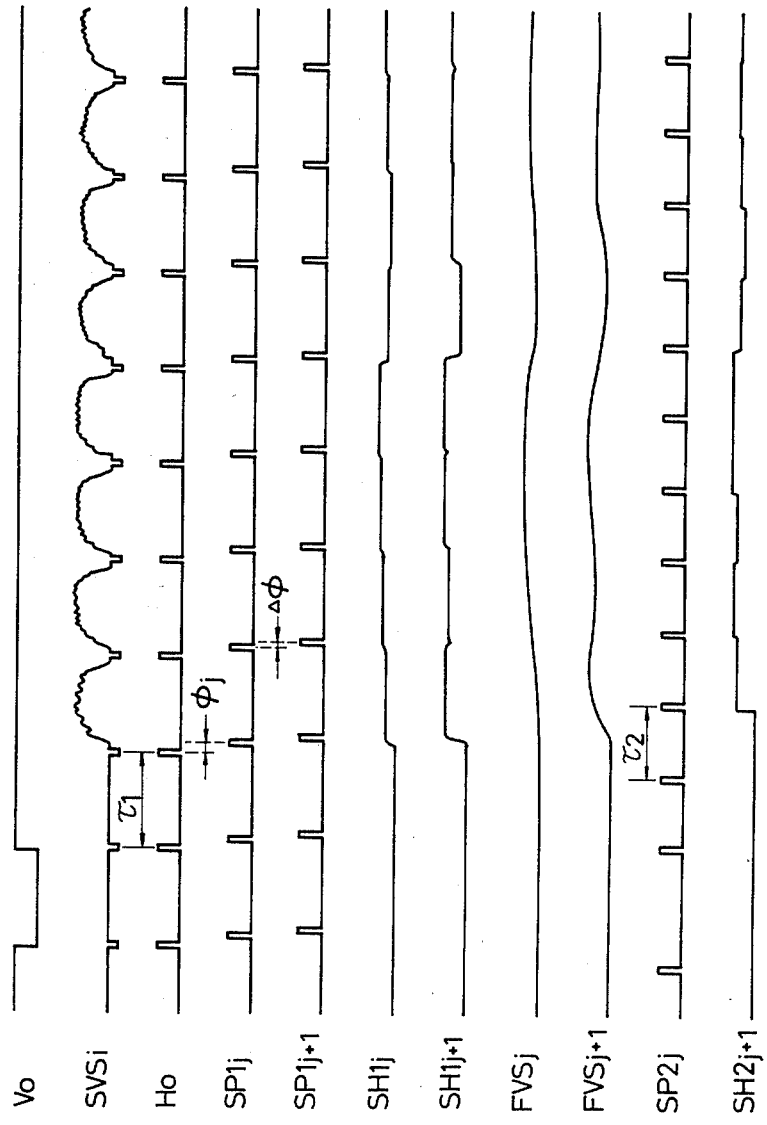

4,563,700

PICTURE SIGNAL PROCESSING METHOD AND APPARATUS THEREFOR

BACKGROUND OF THE INVENTION

1. Field of the Invention

The present invention relates to a picture signal processing method for converting picture signals with horizontal scanning into picture signals with vertical scanning, and more particularly to a method particularly adapted for converting the picture signals into signals adequate for recording on a printer.

2. Description of the Prior Art

In recording picture signals on a printer, the number of sampled picture elements in the vertical direction is generally determined by the number of horizontal scanning lines contained in a cycle of vertical scanning. Consequently the number of picture elements to be recorded on the printer is usually limited to multiples or divisors of the number of horizontal scanning lines, and an arbitrary number of picture elements can only be obtained through complicated processing with a computer. Also a change in the print size can be achieved by modifying the pitch of recording dots, but an enlarged dot pitch results in a coarse image with deteriorated image quality.

SUMMARY OF THE INVENTION

In consideration of the above-mentioned drawbacks in the prior art, an object of the present invention is to provide a picture signal processing method allowing to select any number of samplings in a direction perpendicular to the scanning lines of picture signals independently from the number of said scanning lines, and an apparatus adapted for executing said method.

Another object of the present invention is to provide a printer or a color printer embodying the above-mentioned picture signal processing method or the apparatus therefor.

Still another object of the present invention is to provide a picture signal processing method and an apparatus therefor, for enabling to obtain picture signals of a field from the picture signals of two fields with mutually interlacing scanning lines.

Still other objects of the present invention will become fully apparent from the following detailed description which is to be taken in conjunction with the attached drawings.

BRIEF DESCRIPTION OF THE DRAWINGS

FIG. 3 is a timing chart for various parts of the circuit shown in FIG. 2;

DESCRIPTION OF THE PREFERRED EMBODIMENTS

Now the present invention will be clarified in detail by embodiments thereof shown in the attached drawings.

Figure 1:
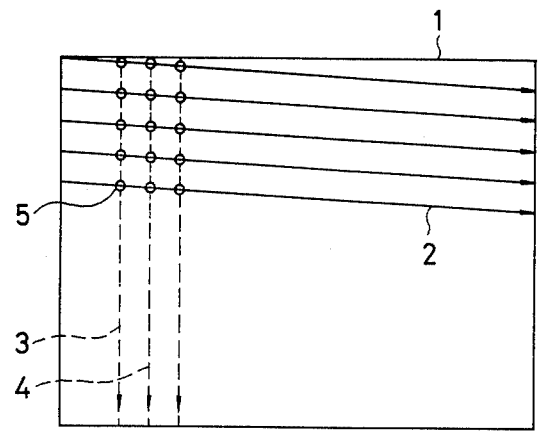
FIG. 1 is a schematic view showing the correspondence between video signals and a picture frame.

FIG. 1 is a schematic view showing the principle of the present invention, wherein shown are an effective picture area 1 of the picture signals on a TV screen; a k-th horizontal scanning line 2 of the picture signals; a j-th pseudo vertical scanning line 3 obtained by the signal processing to be explained later; a (j+1)-th pseudo vertical scanning line 4 like the scanning line 3; a point 5 sampled from the k-th horizontal scanning line by the first sampling pulse.

As shown in this illustration, image signals of vertical scanning can be obtained by sample holdings from the horizontal scanning lines at the interval of the horizontal scanning period.

Figure 2:
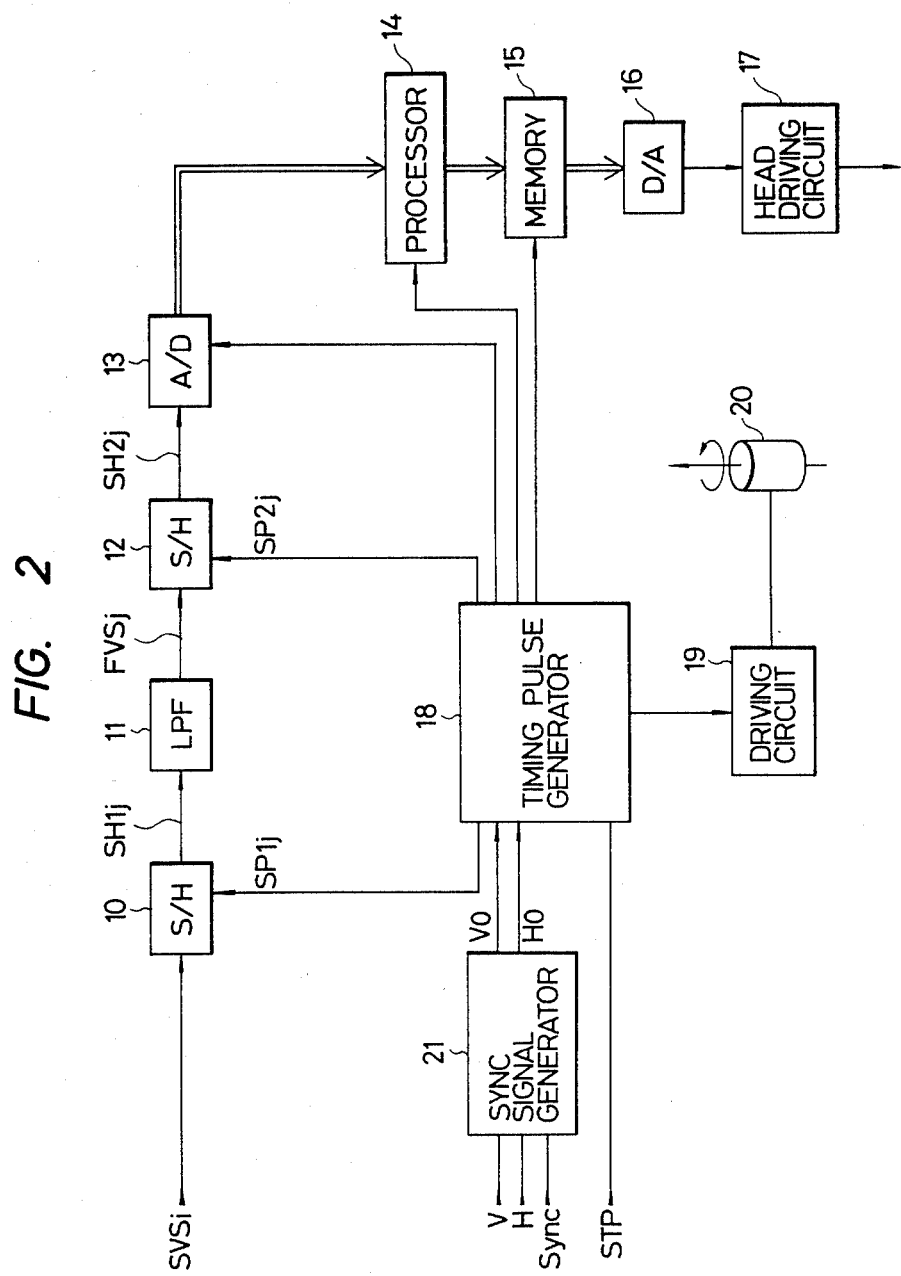
FIG. 2 is a circuit diagram of a signal processing circuit for use in an embodiment of the present invention.

FIG. 2 shows a picture signal processing circuit of the present embodiment, wherein SVSi is a still picture signal in which a same picture signal of one field per one frame is repeated, and SP1j is a first sample-hold (S/H) signal for obtaining a j-th pseudo vertical scanning line. There are also shown:

a first sample-hold circuit 10 for sampling the video signal SVSi with the first S/H signal SP1j;

a filter circuit 11 for filtering a signal SH1j sampled by the first sample-hold 10 and composed of a lowpass filter with an edge enhancing characteristic;

a second sample-hold circuit 12 for again sampling a signal FVSj, obtained by filtering in the filter 11, with second sample-hold (S/H) pulses SP2;

an A/D converter 13 for analog-to-digital conversion of a signal SH2j obtained by sample holding in said second sample-hold circuit;

a digital signal processing circuit 14 for converting thus obtained digital signals into digital signals for printing;

a buffer memory 15 for storing the signals processed by the signal processing circuit 14;

a D/A converter 16 for digital-to-analog conversion of said digital signals temporarily stored in said buffer memory 15;

a head driving circuit 17 for driving a printer head with the analog signals obtained from said D/A converter 16;

a timing pulse generator 18 to be triggered by a start pulse STP for generating timing pulses in response to a signal V0 or H0 shown in FIG. 3;

a driving circuit 19 for driving a driving source 20 for displacing a recording sheet or a recording head; and a synchronizing signal generator 21 for generating said signals H0, V0 from and in synchronization with a horizontal synchronization signal H, a vertical synchronization signal V or composite synchronization signal.

Figure 4A:
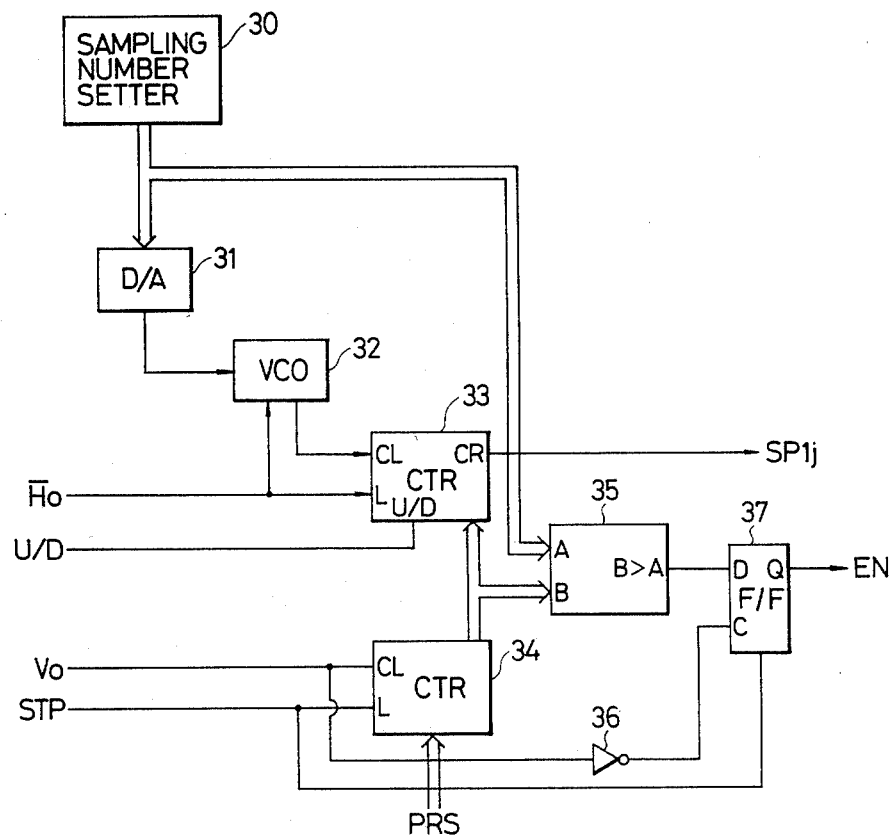
FIGS. 4A and 4B are circuit diagrams showing examples of the circuits respectively for generating timing pulses SP1j, SP2j from V0, H0.
Figure 4B:
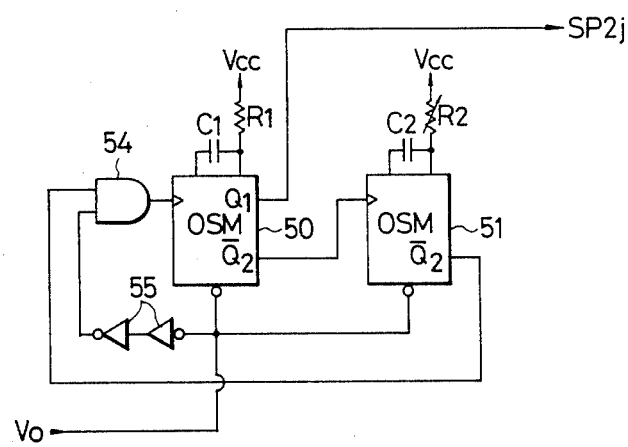

FIG. 3 is a timing chart showing the various signals in the circuit shown in FIG. 2, and FIGS. 4A and 4B show examples of circuits for generating the first and second S/H signals SP1, SP2 from the signals V0, H0.

Figure 5:
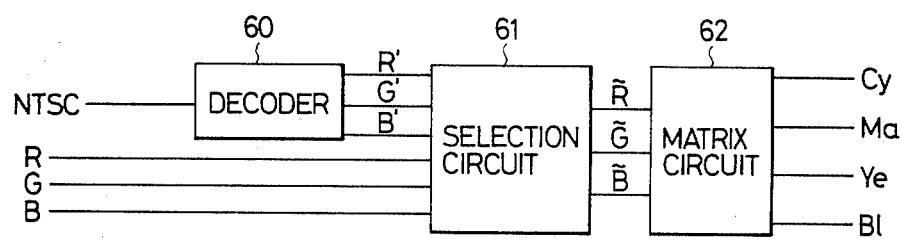
FIG. 5 is a circuit diagram showing a circuit for obtaining color signals Cy, Ma, Ye, Bl for printer from NTSC signal or RGB signal.

FIG. 5 shows a circuit to be added in front of the circuit shown in FIG. 2 in order to produce a color picture. In FIG. 5 there are shown an NTSC decoder 60, a selection circuit 61 for selecting either the chroma signals R', G', B' obtained from the decoder 60 or the picture chroma signals $\bar{R}, \bar{G}, \bar{B}$, and a matrix circuit 62 for producing out of signal R, G and B chroma signals Cy (cyan), Ma (magenta) and Ye (yellow) which respectively represents complementary colors for $\bar{R}, \bar{G}, \bar{B}$ and signal Bl (black).

A color printer can be easily realized by using the circuit of FIG. 2 four times in time-sequence or four sets of similar circuit in parallel, utilizing said signals Cy, Ma, Ye, Bl as the signal SVSi shown in FIG. 2.

Now there will be given an explanation of the function of the above-described circuits.

In the circuit shown in FIG. 2, in response to a start pulse STP, the timing pulse generator 18 is triggered and supplies a first sampling pulse SP1$j$ to the first sample-hold circuit 10 at a phase $j=1$ thereby sampling the video signals in succession from the scanning lines of the video signal at a phase $\phi 1$, thus obtaining signals similar to those obtained through vertical scanning on the picture frame 1. The sampling points constitute a vertical line 3 as shown in FIG. 1, which will be hereinafter called a pseudo vertical scanning line, and the picture signals obtained by tracing a j-th pseudo vertical scanning line will be represented as SH1$j$. The picture signals SH1$j$ are filtered by the low-pass filter 11 accompanied with an edge enhancing characteristic and are thus converted from stepwise signals into a continuous signal FVSj. Said signal FVSj is again sampled in the second sample-hold circuit 12 with second sample-hold signals SP2 of an interval $\tau 2$ to obtain a signal SH2$j$, which has therefore been subjected to the sample holdings of $\tau 1/\tau 2 \times$Nv times, wherein $\tau 1$ is the interval of the signal H0 and Nv is the number of horizontal scanning lines in the effective picture frame. In this manner the number of samples in the vertical direction is increased by $\tau 1/\tau 2$, and the number Nv can be arbitrarily changed for example by a change in the time constant of a monostable multivibrator 51 shown in FIG. 4B. The signal SH2$j$ is converted into digital signal by the A/D converter 13, then subjected to image processing for printing in the processing circuit 14 and temporarily stored in the buffer memory 15. The picture signal subsequently read from said buffer memory 15 is supplied, after digital-to-analog conversion, to the printer head driving circuit 17 to drive an printing head for printing (not shown).

Upon completion of the signal samplings along the first pseudo vertical scanning line, the first S/H signals are switched over to a phase $j=2$ to effect the first sampling with the sampling pulses SP1$_2$ at a phase $\phi 2$, whereby the pseudo vertical scanning line is displaced laterally corresponding to the phase difference $\Delta \phi$. In this manner the pseudo vertical scanning line moves laterally with the progress of the signal processing, and the signal sampling of a picture frame is completed when the lateral movement comes to the end of an effective picture frame, whereby a desired print can be obtained by recording thus sampled signals. The number $N_H$ of the samples in the horizontal direction can be arbitrarily regulated by changing the phase difference $\Delta \phi$.

Now reference is made to FIG. 4A showing a circuit for obtaining an arbitrary number $N_H$ of samples in the horizontal direction, wherein shown are a sampling number setter 30, a D/A converter 31, a voltage-controlled oscillator 32 triggered by the horizontal synchronizing signal H0, an up-down counter 33, a counter 34, a comparator 35, an inverter 36 and a D-type flip-flop 37.

The sample number selected by the sampling number setter 30 is supplied to the D/A converter 31 and is converted therein into a voltage corresponding to the number of samples. The voltage-controlled oscillator 32 supplies the up-down counter 33 with a frequency, for example in a range from 1 MHz to 20 MHz, corresponding to the input voltage.

The counter 34 is loaded with a preset value PRS in response to the start pulse STP, and thereafter counts the vertical synchronizing signals V0 in addition to the preset value PRS.

The up-down counter 33 is loaded with the output of the counter 34 in response to the entry of the horizontal synchronizing signal $\overline{H0}$ and thereafter down-counts the clock pulses of the oscillator 32 from the loaded count. Upon reaching a count zero, the up-down counter 33 releases, from a terminal CR, a carry signal which is utilized as the first S/H pulse SP1$j$.

The interval of said pulses SP1$j$ always coincides with the horizontal scanning period. Also the count of the counter 32 increments by one with each vertical synchronizing signal Vo. In case the oscillator 32 has a higher frequency, the aforementioned phase difference $\Delta \phi$ becomes smaller to increase the number of samples. When the number of samples reaches a number set by the sample number setter 30, the comparator 35 releases a high-level signal, whereby the flip-flop 37 releases an end signal EN in synchronization with the vertical synchronizing signal V0.

In the foregoing explanation it has been assumed that the up-down counter 33 functions in the count-down mode, but it may be used also in the count-up mode if a pulse is generated when the count reaches the predetermined number of samples in the horizontal direction or the number of the pseudo vertical scanning lines. The selective use of the count-down mode and count-up mode allows obtaining the sampling phase from the left or from the right of the picture frame, thereby enabling easy lateral inversion of the picture. The counter 34 can for example be composed of 3 units of SN74LS161 supplied by Texas Instruments, and the up-down counter 33 can for example be composed of 3 units of SN74LS191 supplied by Texas Instruments, but the number m of stages of the counters 33 and 34 should preferably be selected to be equal. Also the number of counter stages should be so selected as to satisfy the following relation with respect to the number Mmax of the samples in the horizontal direction for the maximum oscillation frequency of the oscillator 32:

$$2^m > \text{Mmax}$$

wherein said number Mmax can be represented by:

$$\text{Mmax} = \tau_H / \Delta \phi \text{min}$$

in which $\tau_H$ stands for the horizontal scanning period, and $\Delta \tau_{min}$ stands for the minimum value of $\Delta \phi$.

Now reference is made to FIG. 4B showing a circuit for obtaining the samples of an arbitrary number Nv in the vertical direction.

The circuit shown in FIG. 4B is provided with one-shot (monostable) multivibrators OSM1, OSM2 the time constants of which are determined respectively by a resistor R1 and a condenser C1, and by a variable resistor R2 and a condenser C2. The multivibrators OSM1, OSM2 constitute an oscillating circuit for generating the second sample-hold signals SP2j, of the frequency of which is changed according to the resistance of the variable resistor R2, thus rendering the number Nv of the samples in the vertical direction variable. Said sample number Nv in the vertical direction should preferably be jointly regulated in relation to the sample number $N_H$ in the horizontal direction.

In the present embodiment the counter 34 performs stepwise increments in response to each vertical synchronizing signal V0, but, in a printer with a low scanning speed, the sampling operation should wait during several vertical synchronizing periods after the completion of sampling of a vertical synchronizing period. In such case the vertical synchronizing signal V0 can be supplied to the counter 34 after suitable frequency division.

In case of a color image printing, a circuit as shown in FIG. 5 may be employed for converting the input signals R, G and B through a matrix circuit into complementary color chroma signals Cy (cyan), Ma (magenta) and Ye (yellow) and Bl (black), each of which may be used as the signal SVSi in the circuit shown in FIG. 2. Therefore such color image printing can be achieved by using the circuit of FIG. 2 four times in time-sequence for the chroma signals, or by using four sets of said circuit is parallel. In the latter case, the components 21, 18, 19 and 20 may be used in common for the four sets of circuits. It is furthermore possible to effect the processing by the circuit of FIG. 2 on the input chroma signals R, G, B and to effect the masking process by the processing circuit 14 shown in FIG. 2 thereby obtaining the complementary color chroma signals Cy, Ma and Ye and Bl for recording.

Figure 6:
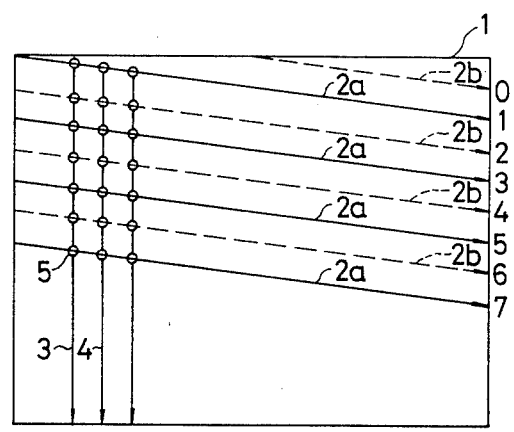
FIG. 6 is a view showing the correspondence between an image area and video signal of one frame composed of mutually interlaced two fields.

Now there will be explained a second embodiment of the present invention, in which picture signals of a frame used for printing are composed of an odd field and an even field which are mutually interlaced. Such picture signals are composed, as shown in FIG. 6, of horizontal scanning lines 2a of an odd field and horizontal scanning lines 2b of an even field.

Figure 7:
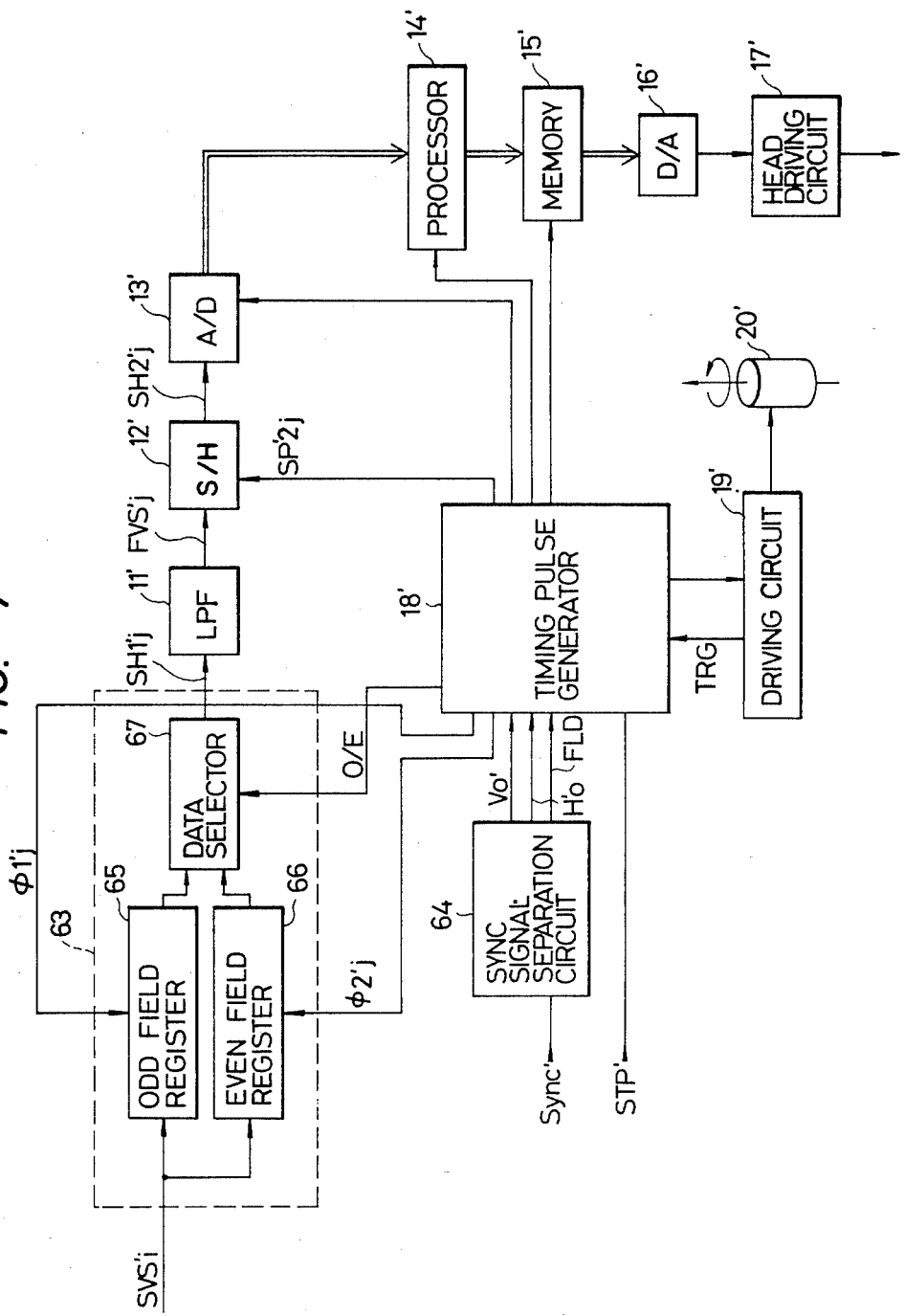
FIG. 7 is a circuit diagram showing a second embodiment of the signal processing circuit.

FIG. 7 shows a processing circuit for still picture signals SVSi' consisting of two fields, wherein components of same functions as those in FIG. 2 are represented by same numbers or codes, with prime marks. In FIG. 7 there are shown a first shift register 63 composed of two analog shift registers 65, 66 and a data selector 67; a synchronizing signal separation circuit 64 for generating, in response to the synchronizing signal Sync', a field signal FLD indicating odd or even field and horizontal and vertical synchronizing signals Ho', Vo'; a data demand signal TRG from the printer driving circuit 19'; shift pulses $\phi 1j'$, $\phi 2j'$, respectively for odd field register 65 and an even field register 66 for temporarily storing the picture signals of pseudo vertical scanning lines in the odd and even fields; and a control signal O/E for a data selector 67 for selecting the output signals either from the odd field register 65 or from the even field register 66 in a state O/E="0" or O/E="1" thereby avoiding the output signal from the register during shifting operation to prevent the noises in the signal SH1j' resulting from such shifting operation.

Also in this embodiment, the change in the number of sampled picture elements is rendered possible by regulating the frequencies of the shift pulses $\phi 2j'$ and the second sample-hold signal SP2j'.

Figure 8:
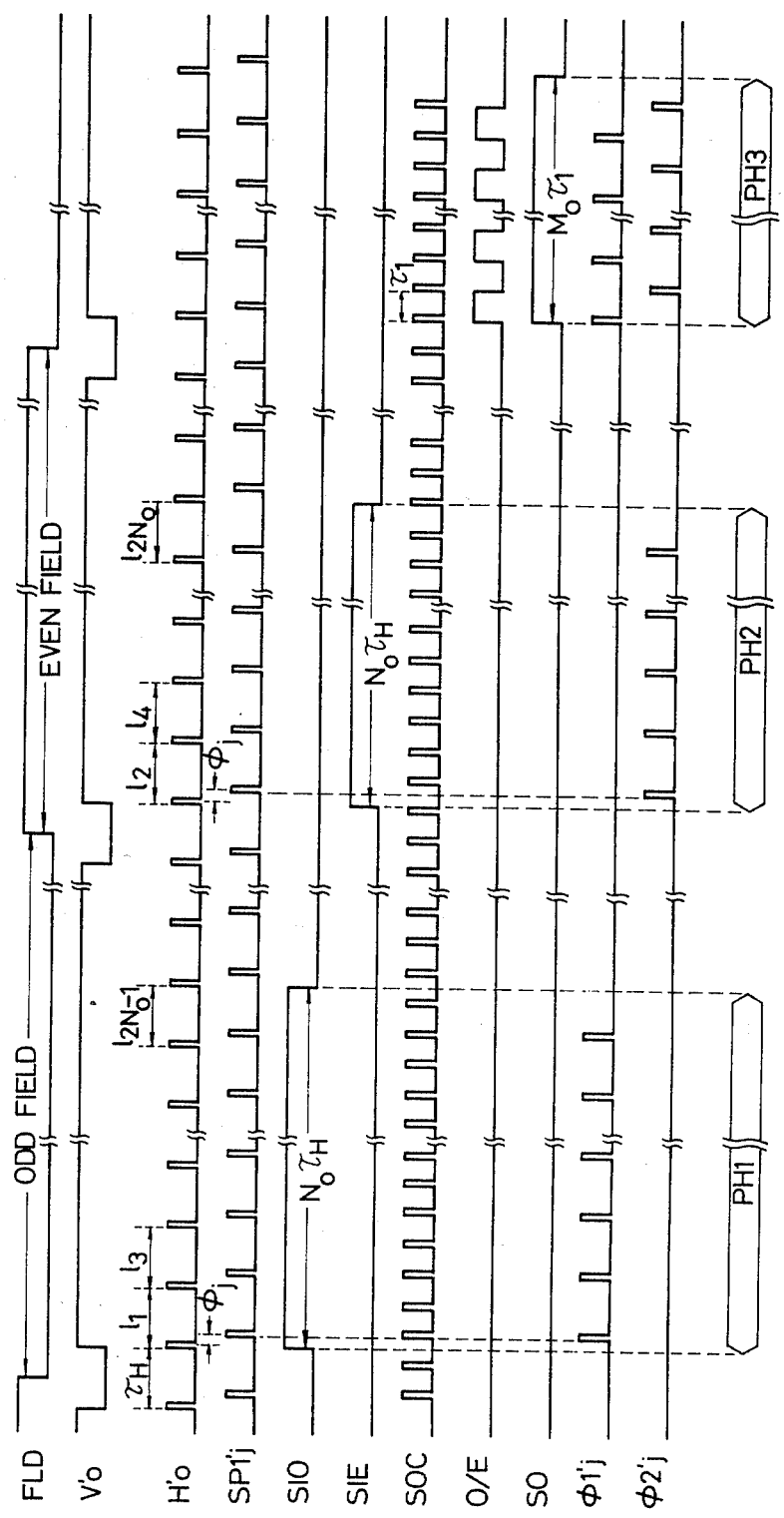
FIG. 8 is a timing chart for various parts of the circuit shown in FIG. 7.

Now reference is made to FIG. 8 showing the function of the above-described second embodiment.

ln (n=1−2No) indicates the horizontal scanning period for the n-th line in which the period is equal to $\tau_H$. $\phi j'$ is the phase of the j-th pseudo vertical scanning line, and PH1 represents the period of data entry into the odd field register 65 in the first shift register 63, and the signal SIO assumes a state "1" during said period. Also PH2 represents the period of data entry into the even field register 66 in said first shift register 63, and the signal SIE assumes a state "1" during said period. PH3 represents the period of alternate signal readout from the odd field register 65 and the even field register 66 in the first shift register 63, and the signal SO assumes a state "1" during this readout period.

No indicates the number of pulses SP1j' during the write period PH1 or PH2, and Mo indicates the number of pulses SOC during the readout period PH3. In case No is equal to the number of steps in the odd or even field register, Mo can be selected equal to 2No.

Figure 9:
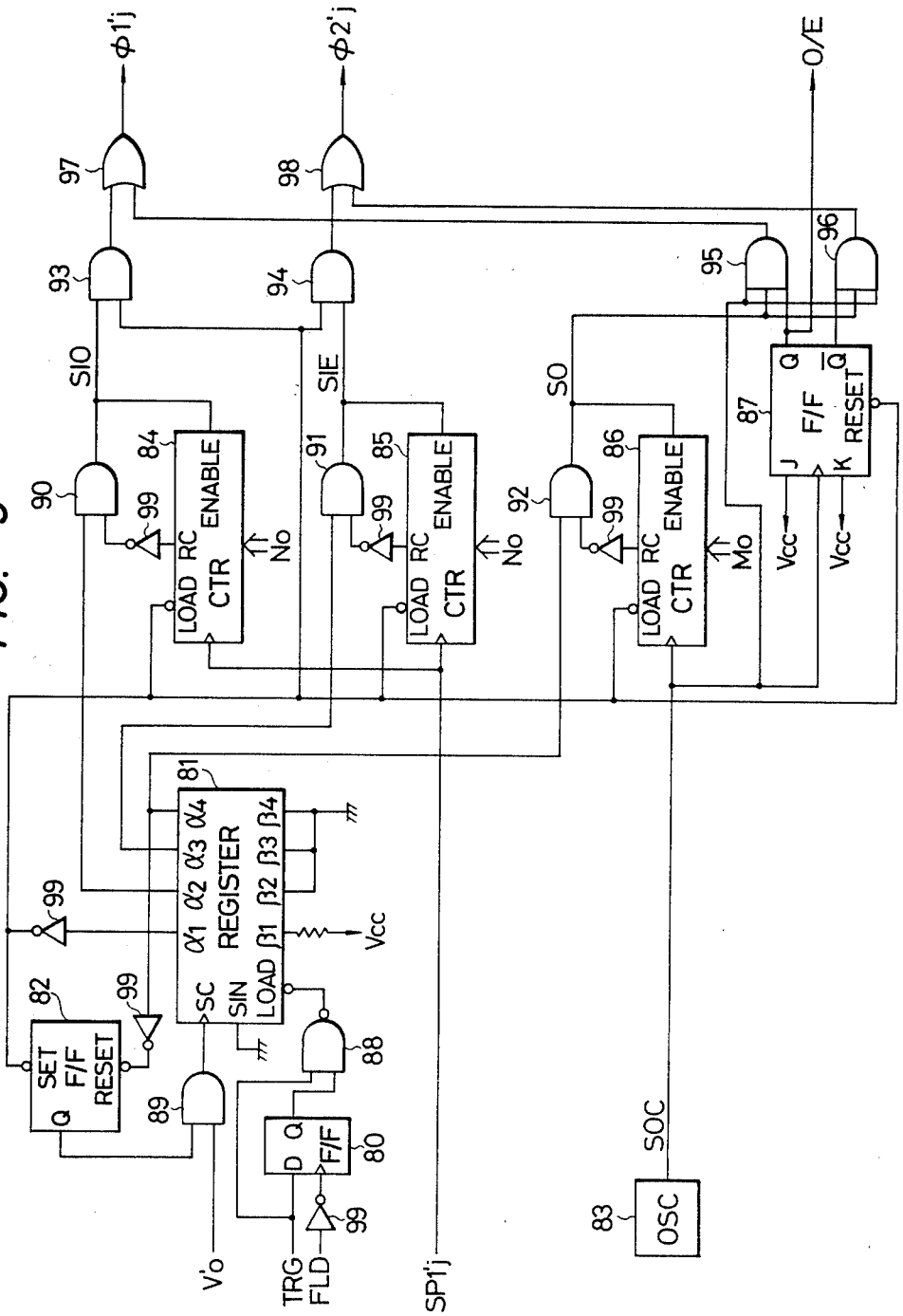
FIG. 9 is a detailed circuit diagram of a timing generator 18' shown in FIG. 7.

FIG. 9 shows the details of the timing pulse generator 18' shown in FIG. 7, wherein the pulses SP1j' and SP2' are omitted since they are already shown in FIGS. 4A and 4B. It is noted that $\Delta\phi'$ and $\tau 2'$ can be arbitrarily changeable.

In FIG. 9 there are shown
a D-type flip-flop 80;
a shift register 81 for example 4 steps, which is serially loaded with signals "0" from a grounded port Sin in synchronization with the shift clock pulses received at a clock input port Sc, wherein the shift register 81 is further provided with input ports $\beta 1$, $\beta 2$, $\beta 3$, $\beta 4$ for parallel entry of the initial values "1", "0", "0", "0" when a load port Load is in a state "0", and output ports $\alpha 1$, $\alpha 2$, $\alpha 3$, $\alpha 4$ of the first to fourth steps;
an RS-type flip-flop 82;
an oscillator 83 for generating readout clock pulses;
count-down counters 84–86 to be respectively loaded with No, No, Mo when the load signal is at "0", wherein ripple carry ports RC release "1"-level signals respectively when the counters 84–86 reach count zero and wherein each of the counters 84–86 is capable of counting operation only when the enable port is at a state "1" but can be loaded regardless of the state of said enable port;
a JK-type flip-flop 87;
a NAND gate 88;
AND gates 89–96;
OR gates 97, 98; and
inverters 99.

Now there will be given an explanation on the function of the circuit shown in FIG. 9.

Upon completion of printing of a line by the printer driving circuit 19', the data demand signal TRD is shifted to a state "1", whereby the output Q of the flip-flop 80 assumes a state "1" at the trailing end of the field signal FLD to cause the NAND gate 88 to release an output signal "0", thereby loading the shift register 81 with the data "1, 0, 0, 0" through the input ports 81–84. Thus the port $\alpha 1$ assumes a state "1" to set the flip-flop 82, thereby shifting the output Q to a state "1" and opening the AND gate 89, thus entering the signal Vo' into the input port Sc of the register 81. The register 81 is shifted by the signal Vo', whereby the state of the output ports $\alpha 1$–$\alpha 4$ changes in succession from "1, 0, 0, 0" to "0, 1, 0, 0", then to "0, 0, 1, 0" and finally to "0, 0, 0, 1". At the final state the flip-flop 82 is reset to close the gate 89 whereby the register 81 is no longer shifted.

In a state α1="1", the ports Load of the counters 84-86 are shifted to "0" whereby the initial values No, No, Mo are loaded therein. Although the gates 90, 91, 92 are open because the ports Rc are normally in a state "0", the counters 84-86 are incapable of counting operation because of the output signals "0" of the ports α2-α4 transmitted through said gates 90, 91, 92.

In a state "0, 1, 0, 0" in which α2="1", the output signal SIO from the gate 90 assumes a state "1" whereby the counter 84 starts to count the number of pulses SP1j'. Until the count reaches the number No, the pulses SP1j' are supplied as the shift pulses φ1j' to the register 65, whereby the sample-hold signals of the odd field are entered into the odd field register 65. Upon completion of the counting operation of the counter 84, the port Rc assumes a state "1" to close the gate 90, thereby terminating the supply of the shift pulses φ1j'. Then, in response to the next one of signal Vo, the field is switched to the even field and the register 81 is shifted.

In a state α3="1", the output signal SIE from the gate 91 assumes a state "1" whereby the counter 85 starts the counting of the pulses SP1j'. Until the count reaches the number No, said pulses SP1j' are supplied as the shift pulses φ2j' to the register 66, whereby the sample-hold signals of the even field are entered into said register 66. Upon completion of the counting operation of the counter 85, the port Rc assumes a state "1" to close the gate 91, thereby shifting the signal SIE to "0" and terminating the supply of the shift pulses φ2j'. Then the ports α1-α4 are shifted to a state "0, 0, 0, 1" in response to the succeeding signal Vo.

In a state α4="1", the gate 92 is opened to shift the signal SO to "1", thereby enabling the counting operation of the counter 86 and simultaneously opening the gates 95, 96. The flip-flop 87 divides the output clock pulses SOC from the oscillator 83, thereby alternately opening the gates 95, 96 and generating the shift pulses φ1j', φ2j' alternately. After the generation of a number Mo inclusive of the pulses φ1j' and φ2j', the counting operation of the counter 86 is inhibited. Also the output Q of the flip-flop 87 is supplied as the selecting signal O/E to the data selector 67 to prevent the generation of shift noises. The pulses φ2j' have a suitable interval τ2, and the first one of the shift pulses SP2j' for signal loading into the second shift register 12' is generated in synchronization with the first one of the pulses φ2j'. Also the flip-flop 87 is reset when α1="1".

As explained in the foregoing, in response to picture signals in which each frame is composed of mutually interlaced two fields are repeatedly entered, each pseudo vertical scanning line is obtained from the picture signals of two fields, so that the picture signals of one field per frame, composed of plural pseudo vertical scanning lines can be prepared from the picture signals of two fields per frame. Also the sampling operation with the second sample-hold signals on the pseudo vertical scanning signals after filtering allows to obtain an arbitrary number of samples independent from the number of horizontal scanning lines of the original picture signals. Also a high-speed A/D converter is not required because of the absence of sampling in the direction of the horizontal scanning lines.

As explained in the foregoing, the present invention allows to select an arbitrary number of samples in the vertical direction independent from the number of the horizontal scanning lines, and to select an arbitrary number of picture elements to be recorded on a printer or to arbitrarily change the pitch of recorded dots without complex processing such as interlacing process. It is also rendered possible to obtain an arbitrary resolving power, and to obtain picture signals of a frame composed of one field from the picture signals of a frame composed of two fields. In this manner an easier conversion is made possible from the television signals such as NTSC signals into picture signals suitable for recording on a printer of for transmission through a telephone line.

Although the foregoing embodiments have been limited to the case of obtaining a printed image as the final output, the present invention is applicable also to any other output such as for transmission through a telephone line.

Also the present invention is by no means limited to the foregoing embodiments but is subject to various modifications and variations within the scope and spirit of the appended claims.

What is claimed is:

1. A picture signal processing method for obtaining a picture signal having plural vertical scanning lines from an input picture signal having a plurality of horizontal scanning lines, comprising the steps of:
    sampling the input picture signal at each horizontal scanning line thereof by means of first sampling signals generated at an interval substantially corresponding to the horizontal scanning period of the input picture signal;
    filtering the signal obtained by sampling with said first sampling signals to obtain vertical scanning signals; and
    sampling the vertical scanning signals a number of times, which number is different from the number comprising the plurality of horizontal scanning lines in the input picture signal.

2. A picture signal processing method according to claim 1, wherein said filtering step comprises low-pass filtering.

3. A picture signal processing method according to claim 1, wherein the interval at which the vertical scanning signals are sampled is variable.

4. A picture signal processing method according to claim 1, wherein the interval at which the vertical scanning signals are sampled is variable.

5. A picture signal processing method according to claim 1, wherein the phase of generation of the first sampling signals for obtaining a certain vertical scanning line is constant with respect to the horizontal synchronizing signals of the picture signals.

6. A picture signal processing method according to claim 5, wherein the difference between said phase of generation for a j-th vertical scanning line and for a (j+1)-th vertical scanning line is constant, where j=0, 1, 2, . . . , for one field of the input picture signal.

7. A picture signal processing method according to claim 6, wherein said difference between the phases of generation is variable for different fields of the input picture signal.

8. A picture signal processing method for obtaining a picture signal having plural vertical scanning lines from an input picture signal having a plurality of horizontal scanning lines in mutually interlaced first and second field signals, comprising the steps of:
    sampling the first field signals at each horizontal scanning line thereof by means of sampling signals generated at an interval substantially corresponding to the horizontal scanning period of the input picture signal and storing the thus sampled signals in a first memory;

sampling the second field signals by means of said sampling signals and storing the thus sampled signals in a second memory;

reading the contents of said first and second memories alternately by means of readout signals of a determined frequency;

filtering the signals read from the first and second memories to obtain vertical scanning signals; and sampling the vertical scanning signals a number of times, which number is different from the number comprising the plurality of horizontal scanning lines in the input picture signal.

9. A picture signal processing method according to claim 8, wherein said filtering step comprises low-pass filtering.

10. A picture signal processing method according to claim 8, wherein the interval at which the vertical scanning signals are sampled is arbitrarily variable.

11. A picture signal processing method according to claim 8, wherein the phase of generation of said sampling signals for obtaining a certain vertical scanning line is constant with respect to the horizontal synchronizing signals of the picture signals.

12. A picture signal processing method according to claim 11, wherein the difference between said phase of generation for a j-th vertical scanning line and that for a (j+1)-th vertical scanning line is constant, where j=0, 1, 2, ..., for one field of the input picture signal.

13. A picture signal processing method according to claim 12, wherein said difference between the phases of generation is arbitrarily variable for different fields of the input picture signal.

14. A picture signal processing method according to claim 12, wherein the interval at which the vertical scanning signals are sampled is arbitrarily variable.

15. A picture signal processing apparatus for obtaining a picture signal having plural vertical scanning lines from an input picture signal having a plurality of horizontal scanning lines, the apparatus comprising:

a first sample-hold circuit for sampling the input picture signal at each horizontal scanning line thereof by means of first sampling signals generated at an interval substantially corresponding to the horizontal scanning period of the input picture signal;

a filter circuit for filtering the output signals of said first sample-hold circuit to obtain vertical scanning signals; and a second sample-hold circuit for sampling the vertical scanning signals a number of times, which number is different from the number comprising the plurality of horizontal scanning lines in the input picture signal.

16. A recording apparatus according to claim 15, further comprising recording means for recording in response to the output signals of said second sample-hold circuit.

17. A recording apparatus according to claim 16, wherein said recording means is capable of recording a color image.

18. A picture signal processing apparatus for obtaining a picture signal having plural vertical scanning lines from an input picture signal having a plurality of horizontal scanning lines in mutually interlaced first and second field signals, the apparatus comprising:

sampling signal generating means for generating sampling signals for sampling the input picture signal at intervals substantially corresponding to the horizontal scanning period thereof;

first memory means for storing the sample signals obtained by sampling said first field signals with said sampling signals;

second memory means for storing the sample signals obtained by sampling said second field signals with said sampling signals;

readout means for alternately reading the sample signals stored in said first and second memory means, said readout means including selecting means for alternately selecting the outputs of said first and second memory means; and a sample-hold circuit for sampling the output signals from said readout means a number of times, which number is different from the number comprising the plurality of horizontal scanning lines in the input picture signal.

19. A picture signal processing apparatus according to claim 18, wherein said first and second memory means are composed of analog shift registers.

20. A picture signal processing apparatus according to claim 18, further comprising a filter circuit positioned between said readout means and said sample-hold circuit for filtering the output signals from said readout means.

21. A picture signal processing apparatus according to claim 20, wherein said filter circuit comprises a low-pass filter having an edge enhancing characteristic.

22. A recording apparatus according to claim 21, further comprising recording means for recording in response to the output of said sample-hold circuit.

23. A recording apparatus according to claim 22, wherein said recording means is capable of recording a color picture.

* * * * *

UNITED STATES PATENT AND TRADEMARK OFFICE
CERTIFICATE OF CORRECTION

PATENT NO. : 4,563,700

DATED : January 7, 1986

INVENTOR(S) : YUICHI SATO

It is certified that error appears in the above-identified patent and that said Letters Patent is hereby corrected as shown below:

Column 3, line 4, change "signals $\tilde{R}$, $\tilde{G}$, $\tilde{B}$," to --signals R, G, B,--;

line 5, change "signal R, G, and B" to --signals $\tilde{R}$, $\tilde{G}$ and $\tilde{B}$--; and line 47, change "an printing" to --a printing--.

Column 4, line 61, change "and $\Delta\tau_{min}$" to --and $\Delta\phi_{min}$--.

Column 5, line 3, delete "of"; and line 28, change "is parallel." to --in parallel.--.

Column 6, line 52, change "on the" to --of the--; and line 61, change "81-84." to -- $\beta 1$- $\beta 4$.--.

Column 8, line 46, change "1" to --6--.

Signed and Sealed this

Sixteenth Day of September 1986

[SEAL]

Attest:

DONALD J. QUIGG

Attesting Officer    Commissioner of Patents and Trademarks